Figure 1:
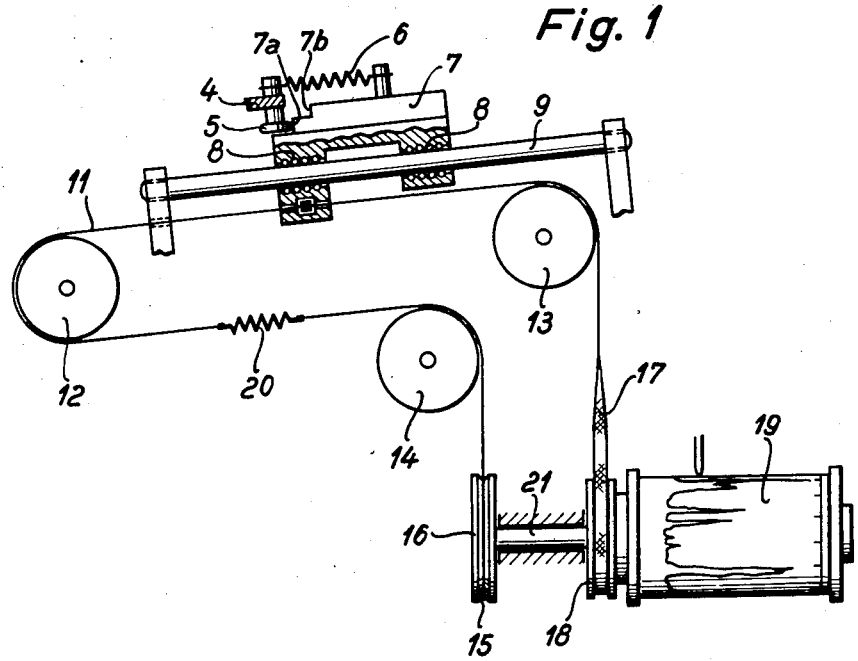

Feb. 13, 1962   A. REICHEL   3,020,794
SPECTROMETER GRATING CONTROL ARRANGEMENT
Filed April 3, 1961

INVENTOR
ARTUR REICHEL
BY
Toulmin & Toulmin
Attorneys

United States Patent Office 3,020,794
Patented Feb. 13, 1962

3,020,794
SPECTROMETER GRATING CONTROL
ARRANGEMENT
Artur Reichel, Wetzlar (Lahn), Germany, assignor to Ernst Leitz, Gesellschaft mit beschränkter Haftung, Wetzlar (Lahn), Germany
Filed Apr. 3, 1961, Ser. No. 100,301
Claims priority, application Germany Apr. 23, 1960
7 Claims. (Cl. 88—14)

The present invention relates to a control arrangement for spectrometers and spectrographs, more particularly, to a structure for pivoting the diffraction grating in a predetermined relationship to a rotating recording drum.

Various structures have been previously proposed to obtain a predetermined proportional relationship between a wave length to be measured and the path of the adjusting device for the diffraction grating in spectographs. One prior art arrangement comprised the use of curved sections or disks.

Another previous structure has been a so-called sine-screw for use in adjusting the position of the diffraction grating. In this arrangement a screw has a measuring or controlling function and has at one end thereof a plate which is perpendicular to the longitudinal axis of the screw. This plate functions as a face cam and a cam follower in the form of a roller or a ball which is fastened to an arm engages said vertical plate. This arm is mounted on the supporting structure for the diffraction grating. The measuring screw can be divided according to the various wave lengths.

These above-described arrangements have the disadvantage that the recording of the results onto a recording drum requires a complex gear train which must be accurately made. Accordingly, any inaccuracies in the gears and the presence of any backlash thereof will introduce errors in the transmission of the results obtained from the spectograph onto a recording drum upon which the results are to be recorded.

It is therefore the principal object of this invention to provide a novel and improved arrangement for pivoting the diffraction grating in spectrometers and spectographs.

It is a further object of this invention to provide a control structure for pivoting the diffraction grating in spectrometers and spectographs in a predetermined relationship to the wave lengths of the rays emerging from a monochromator.

The present invention essentially comprises a simple and effective structure for controlling the pivoting movement of the diffraction grating in spectrometers and spectographs with a linear relationship between the control arrangement and the wave lengths of the rays emerging from the monochromator. This structure of the present invention comprises a carrier which is slidably mounted for rectilinear motion. This carrier comprises a plurality of linear cam surfaces which cooperate with a cam follower. The cam follower is mounted on an arm which extends outwardly from a pivotally mounted diffraction grating. A belt or cable interconnects the rotary recording drum and the slidably mounted carrier.

A non-linear relationship can be obtained between the wave lengths of the rays emerging from the monochromator and the recording of the wave on a recording drum. This relationship can be obtained by varying the length of the cam follower arm or by employing a controlling drum for the belt which drum has an irregular radius with respect to its axis of rotation. In addition, curved or non-linear cam surfaces can be used on the carrier.

Figure 2:
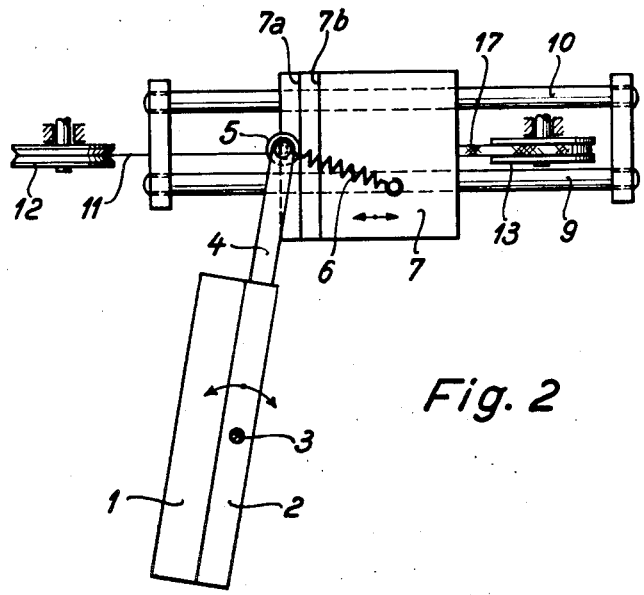

Other objects and advantages of this invention will be apparent upon reference to the accompanying description when taken in conjunction with the following drawings, wherein FIGURE 1 is a side elevational view of the control arrangement of this invention; and FIGURE 2 is a top plan view of a portion of the control arrangement as illustrated in FIGURE 1.

Returning now to the drawings wherein like reference symbols indicate the same parts throughout the various views a specific embodiment and several modifications of this invention will be described in detail.

Returning to both FIGURES 1 and 2 there is a diffraction grating 1 which is mounted on a carrier member 2 which, in turn, is pivotally supported about an axis 3. An arm 4 extends outwardly from the carrier 2 and there is a roller 5 mounted on the free end of the arm 4 to form a cam follower. The roller 5 may have a spherically formed exterior roller surface.

The cam follower 5 engages a cam surface 7a which is mounted on a carrier 7. The carrier 7 is slidably mounted upon two fixedly supported cylindrical rods 9 and 10. Linear bearings 8 are provided in the carrier 7 for guiding the movement of the carrier 7 upon the rods 9 and 10. A coil spring 6 is connected between the carrier 7 and the arm 4 so as to maintain the cam follower 5 in engagement with the cam surface 7a with a virtually constant force. The carrier 7 is attached to a belt or cable 11 which is guided around a pulley system comprising guide rollers 12, 13 and 14. One end of the belt 11 is attached to a circumferential groove 15 in an actuating drum 16.

The other end of the belt 11, connected at 17, is twisted through a 90° angle and is attached to an actuating drum 18. The drums 16 and 18 are mounted about a journalled shaft 21. In addition, a recording drum 19 is also fixed upon the shaft 21.

A spring 20 is inserted in the belt 11 and serves to eliminate any lost motion in the movement of the belt.

To facilitate calibration of the diffraction grating the cam surface 7a is detachably mounted on the carrier 7. The second cam surface 7b is also detachably mounted on the carrier in order to permit the use of this control arrangement for other diffraction gratings which may have other initial positions. Various other predetermined relationships can be obtained between the wave lengths of the emerging rays and the recording thereof on the recording drum by employing cam surfaces which may be curved or may have other non-linear forms.

Different interrelations between the wave lengths of the emerging waves and the recording thereof on a recording drum can also be obtained by eccentrically mounting the actuating drums on the shaft 21. Further, the drums may be given asymmetrical shapes with respect to the axes of rotation. The drums can be so constructed as to be detachably mounted on the shaft 21. This will permit the ready exchangeability of the actuating drum so as to obtain various relationships between wave lengths and the recording thereof on the recording drum or other recording means.

The cam follower arm 4 can be constructed so as to have an adjustable length whereby the amplitude of the recordings on the recording drum can be proportionately increased or decreased. As a result, the vertical scale of the records can be varied depending on the final use to which the recordings of the wave lengths are to be put.

In the operation of this control arrangement it is apparent that rotation of the shaft 21 will rotate the actuating drums 16 and 18 and the recording drum 19 all of which are fixedly mounted thereon. Accordingly, the belt 11 will unwind from one of the actuating drums 16 or 18 and will accordingly be wound on the other of the actuating drums. The pulleys 12 and 13 are arranged in a line which is substantially parallel to the rectilinear path of the carrier 7. The carrier 7 is attached to the reach of the belt 11 between the pulleys 12 and 13. Accordingly, linear movement of the belt 11 in the reach between the pulleys 12 and 13 will cause the carrier 7 to move upon the cylindrical guides 9 and 10. The presence of the spring 20 will ensure a constant tension of the belt 11 and hence will eliminate any lost motion between the movement of the carrier and the rotation of the recording drum.

Thus it can be seen that the present invention provides a simple and effective device for obtaining any desired interrelationship between wave lengths of rays emerging from a monochromator and the recordings of these wave lengths on a recording drum.

It will be understood that this invention is susceptible to modification in order to adapt it to different usages and conditions and, accordingly, it is desired to comprehend such modifications within this invention as may fall within the scope of the appended claims.

What I claim is:

1. A control device for spectrometers and spectrographs comprising a diffraction grating mounted for pivotal movement, a cam follower mounted on said diffraction grating, a linearly moveable carrier having a cam surface thereon cooperating with said cam follower, a rotatable recording drum, and a belt interconnecting said drum and said carrier so that rotation of said drum moves said carrier and pivots said diffraction grating in relationship to the movement of the drum.

2. In spectrometers and spectrographs, the combination of a diffraction grating mounted for pivotal movement, a cam follower mounted on said diffraction grating, a linearly moveable carrier having a cam surface thereon cooperating with said cam follower, a rotatable recording drum, and a belt interconnecting said drum and said carrier so that rotation of said drum moves said carrier and pivots said diffraction grating in relationship to the movement of the drum.

3. A control device for spectrometers and spectrographs comprising a pivotally mounted diffraction grating, a cam follower mounted on said diffraction grating, a linearly moveable carrier having a cam surface thereon cooperating with said cam follower, a journalled shaft, first and second actuating drums and a recording drum mounted on said shaft, a belt adapted to be unwound from one of said actuating drums and adapted to be wound onto the other actuating drum, said belt being connected to said carrier between said actuating drums so that said carrier and diffraction grating are moved in relationship to the rotation of said recording drum.

4. A control device for spectrometers and spectrographs comprising a pivotally mounted diffraction grating, a cam follower mounted on said diffraction grating, a linearly moveable carrier having a cam surface thereon cooperating with said cam follower, a journalled shaft, first and second actuating drums and a recording drum mounted on said shaft, a pulley system including two spaced pulleys on a line parallel to the path of linear movement of said carrier, and a belt adapted to be unwound from one of said actuating drums and adapted to be wound onto the other actuating drum and passing over said pulley system, said belt being attached to said carrier between said two spaced pulleys.

5. A control device for spectrometers and spectrographs comprising a pivotally mounted diffraction grating, an arm extending from said diffraction grating the length of said arm being variable, a cam follower on the end of said arm, a linearly moveable carrier having a cam surface thereon cooperating with said cam follower, a rotatable recording drum, and a belt interconnecting said drum and said carrier so that rotation of said drum moves said carrier and pivots said diffraction grating in relationship thereto.

6. A control device for spectrometers and spectrographs comprising a pivotally mounted diffraction grating, a cam follower mounted on said diffraction grating, a linearly moveable carrier having a cam surface thereon cooperating with said cam follower, a journalled shaft, first and second actuating drums and a recording drum mounted on said shaft, one of said actuating drums controlling the movement of said carrier and having a circular cross-section with respect to its axis of rotation, a belt adapted to be unwound from one of said actuating drums and adapted to be wound onto the other actuating drum, said belt being connected to said carrier between said actuating drums so that said carrier and diffraction grating are moved in relationship to the rotation of said recording drum.

7. A control device for spectrometers and spectrographs comprising a pivotally mounted diffraction grating, a cam follower mounted on said diffraction grating, a linearly moveable carrier having a cam surface thereon cooperating with said cam follower, a journalled shaft, first and second actuating drums and a recording drum mounted on said shaft, one of said actuating drums controlling the movement of said carrier and having an asymmetrical cross-section with respect to its axis of rotation, a belt adapted to be unwound from one of said actuating drums and adapted to be wound onto the other actuating drum, said belt being connected to said carrier between said actuating drums so that said carrier and diffraction grating are moved in relationship to the rotation of said recording drum.

No references cited.